United States Patent
Bernstein et al.

[15] 3,666,799
[45] May 30, 1972

[54] TRIIODATED TOLUIC ACIDS

[72] Inventors: Jack Bernstein; Kathryn Alice Losee, both of New Brunswick, N.J.

[73] Assignee: E. R. Squibb & Sons, Inc., New York, N.Y.

[22] Filed: June 19, 1970

[21] Appl. No.: 47,882

[52] U.S. Cl. ............260/518 A, 260/471 R, 260/501.11, 424/5
[51] Int. Cl. ............................................C07c 103/30
[58] Field of Search ..........424/5; 260/518 A, 471 R, 501.11

[56] References Cited

OTHER PUBLICATIONS

Feiser; L. F. et al. Organic Chemistry, 3rd Edition, (1956), Pub. Reinhold Corp. N.Y. Page 608 cited.

Primary Examiner—Lorraine A. Weinberger
Assistant Examiner—L. Arnold Thaxton
Attorney—Lawrence S. Levinson, Merle J. Smith, Donald J. Perrella and Burton Rodney

[57] ABSTRACT

This invention relates to new carbamoyl derivatives of diaminotriiodo-m-toluic acid having the formula

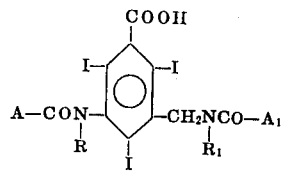

and to salts and lower alkyl esters of these compounds, which are useful as radiopaque agents.

8 Claims, No Drawings

TRIIODATED TOLUIC ACIDS

It is an object of the present invention to provide new compounds which are useful as radiopaque agents. Another object is to provide methods for the preparation of these compounds. These and other objects of the present invention will be apparent from the following description.

SUMMARY OF THE INVENTION

This invention relates to new compounds of the formula I

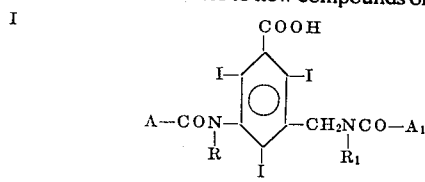

wherein R and $R_1$ are hydrogen or lower alkyl and A and $A_1$ are lower alkyl or

in which $R_2$ is hydrogen or lower alkyl and $R_3$ is lower alkyl, with the limitation that A and $A_1$ cannot both be lower alkyl in any compound, and to basic salts of these compounds, e.g. alkali metal salts such as sodium and potassium, alkaline earth salts such as calcium, ammonium salts and amine salts such as N-methylglucamine, as well as lower aliphatic esters such as the methyl, ethyl and butyl esters, of up to six carbon atoms.

The new compounds of the present invention include the following types of compounds as well as the above-mentioned basic salts and aliphatic esters thereof; 5-acyl-amino-α-(3-alkylureido)-2,4,6-triiodo-m-toluic acids, such as 5-acetamido-α-(3-methylureido)-2,4,6-triiodo-m-toluic acid, 5-acetamido-α-(3-ethylureido)-2,4,6-triiodo-m-toluic acid, 5-acetamido-α-(3-n-butylureido)-2,4,6-triiodo-m-toluic acid, 5-propionylamino-α-(3-methylureido)-2,4,6-triiodo-m-toluic acid, and 5-(acetyl-N-ethylamino)-α-(3-methylureido)-2,4,6-triiodo-m-toluic acid; 5-acylamino-α-(dialkylureido)-2,4,6-triiodo-m-toluic acids, such as 5-acetamido-α-(3,3-dimethylureido)-2,4,6-triiodo-m-toluic acid, 5-(acetyl-N-ethylamino)-α(3,3-dimethylureido)-2,4,6-triiodo-m-toluic acid, 5-acetamido-α-(1-ethyl-3-methylureido)-2,4,6-triiodo-m-toluic acid and 5-(acetyl-N-ethylamino)-α-(1-ethyl-3-methylureido)-2,4,6-triiodo-m-toluic acid; 5-acylamino-α-(1,3,3,-trialkylureido)-2,4,6-triiodo-m-toluic acids, such as 5-acetamido-α-(1-ethyl-3,3-dimethylureido)-2,4,6-triiodo-m-toluic acid and 5-(acetyl-N-ethylamino)-α-(1-ethyl-3,3-dimethylureido)-2,4,6-triiodo-m-toluic acid; 5-(3-alkylureido)-α-acylamino-2,4,6-triiodo-m-toluic acids, such as 5-(3-methylureido)-α-acetamido-2,4,6-triiodo-m-toluic acid and 5-(3-methylureido)-α-(acetyl-N-ethylamino)-2,4,6-triiodo-m-toluic acid; 5-(dialkylureido)-α-acylamino-2,4,6-triiodo-m-toluic acids such as 5-(3,3-dimethylureido)-α-acetamido-2,4,6-triiodo-m-toluic acid, 5-(3,3-dimethylureido)-α-(acetyl-N-ethylamino)-2,4,6-triiodo-m-toluic acid, 5-(1-ethyl-3-methylureido)-α-acetamido-2,4,6-triiodo-m-toluic acid and 5-(1-ethyl-3-methylureido)-α-(acetyl-N-ethylamino)-2,4,6-triiodo-m-toluic acid; 5-(trialkylureido)-α-acylamino-2,4,6-triiodo-m-toluic acids, such as 5-(1-ethyl-3,3-dimethylureido)-α-(acetamido)-2,4,6-triiodo-m-toluic acid and 5-(1-ethyl-3,3-dimethylureido)-α-(acetyl-N-ethylamino)-2,4,6-triiodo-m-toluic acid; 5,α-bis(alkylureido)-2,4,6-triiodo-m-toluic acids such as 5,α-bis-(3-methylureido)-2,4,6-triiodo-m-toluic acid, 5-(3-ethylureido)-α-(3-methylureido)-2,4,6-triiodo-m-toluic acid, 5-(3-methylureido)-α-(3,3-dimethyl-ureido)-2,4,6-triiodo-m-toluic acid, 5-(3methylureido)-α-(1-ethyl-3-methylureido)-2,4,6-triiodo-m-toluic acid, 5-(3-methylureido)-α-(1-ethyl-3,3-dimethylureido)-2,4,6-triiodo-m-toluic acid, 5-(3,3-dimethylureido)-α-(3-methylureido)-2,4,6-triiodo-m-toluic acid, 5-(3,3-dimethylureido)-α-(1-ethyl-3-methylureido)-2,4,6-triiodo-m-toluic acid, 5,α-bis(3,3-dimethylureido)-2,4,6-triiodo-m-toluic acid, 5-(3,3-dimethylureido)-α-(1-ethyl-3,3-dimethylureido)-2,4,6-triiodo-m-toluic acid, 5-(1-ethyl-3-methylureido)-α-(3-methylureido)-2,4,6-triiodo-m-toluic acid, 5,α-bis-(1-ethyl-3-methylureido)-2,4,6-triiodo-m-toluic acid, 5-(1-ethyl-3-methylureido)-α-(1-ethyl-3,3-dimethyl)-2,4,6-triiodo-m-toluic acid, 5-(1-ethyl-3,3-dimethylureido)-α-(3-methyl-ureido)-2,4,6-triiodo-m-toluic acid, 5-(1-ethyl-3,3-dimethyl-ureido)-α-(3,3-dimethylureido)-2,4,6-triiodo-m-toluic acid, 5-(1-ethyl-3,3-dimethylureido)-α-(1-ethyl-3-methylureido)-2,4,6-triiodo-m-toluic acid and 5,α-bis(1-ethyl-3,3-dimethyl-ureido)-2,4,6-triiodo-m-toluic acid.

The compounds of this invention may be prepared by the reaction of a compound of formula

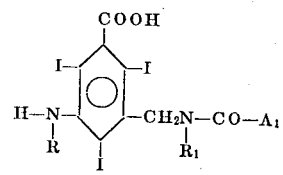

with an acid anhydride when A in the compound desired of formula I is lower alkyl, with an alkyl isocyanate when A in the compound desired of formula I is $R_3NH$, and with a dialkylcarbamoyl halide, when A in the compound desired is dialkylamino.

The compounds of formula II may be prepared by iodination of a compound of formula

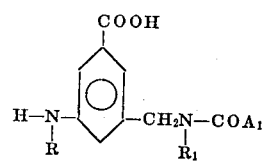

with iodine chloride in aqueous medium or with sodium or potassium iododichloride in aqueous medium.

The compounds of formula III in which R is hydrogen may be prepared by the reduction of a nitro compound of the formula

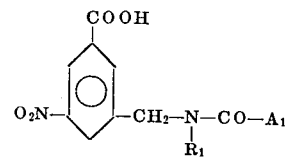

The compounds of formula III in which R is lower alkyl may be prepared by the reduction of the Schiff base of a compound of formula III in which R is hydrogen.

Compounds of formula IV are prepared by treatment of a compound of the formula

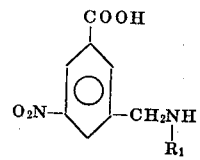

with an acid anhydride when $A_1$ in the compound desired of formula IV is lower alkyl, with an alkyl isocyanate when $A_1$ in the compound desired of formula IV is $R_3NH$ and with a dialkylcarbamoyl halide when $A_1$ in the compound desired is dialkylamino.

The compound of the formula V in which $R_1$ is hydrogen is prepared as described in Helv. Chem. Acta 48, 259 (1965). Compounds of the formula V in which $R_1$ is lower alkyl are prepared by the sodium borohydride reduction of the Schiff base prepared from a aldehyde and compound V in which $R_1$ is hydrogen.

Compounds of the formula I in which A and $A_1$ are the same may also be prepared by the reaction of a compound of the formula

VI

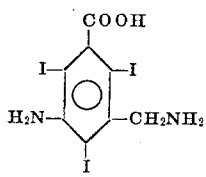

with an alkyl isocyanate or a dialkylcarbamoyl halide.

The lower alkyl groups R, $R_1$ and $R_2$ include straight or branched alkyl chains of up to six carbon atoms such as methyl, ethyl, propyl, i-propyl, n-butyl, i-butyl, n-pentyl, 2-methylbutyl, neopentyl, n-hexyl, 2-methylpentyl, 3-methylpentyl, 2,2-dimethylbutyl, and 2,3-dimethylbutyl.

The new products of formula I are useful as radiopaque agents for visualization of animal systems or organs, preferably in the form of physiologically acceptable salts such as sodium or methylglucamine salts for the preparation of solutions for intravascular injection for urography and for vasographic techniques such as angiocardiography, arteriography, nephrography and venography. The water-insoluble esters are useful in visualizing hollow organs and cavities having external orifices through which the contrast preparation can be introduced in preparation for the examination and removed therefrom after the examination is completed. Solutions having about 20 to 50 percent bound iodine, preferably about 37 percent may be used, or on a weight basis from about 20 g to about 75 g of a compound of formula I per 100 ml of water.

The following examples illustrate the present invention without, however, limiting the same thereto. All temperatures are on the Centigrade scale.

EXAMPLE 1

5-Acetamido-α-(3-methylureido)-2,4,6-triiodo-m-toluic acid a. 5-Nitro-α-(3-methylureido)-m-toluic acid A mixture of 2 grams 5-nitro-α-amino-m-toluic acid, 2 ml of methyl isocyanate and 100 ml of ethylene glycol dimethyl ether is heated under reflux for twenty hours. The solvent is removed by distillation and the residue triturated with dilute hydrochloric acid. The solid is filtered, and dissolved in dilute aqueous sodium hydroxide solution. The solution is treated with decolorizing carbon, filtered and acidified with 20 percent hydrochloric acid. The precipitated solid is filtered, washed with water and crystallized from aqueous alcohol to yield the desired 5-nitro-α-(3-methyl-ureido)-m-toluic acid.

b. 5-Amino-α-(3-methylureido)-m-toluic acid

To a mixture of 10 grams of 5-nitro-α-(3-methylureido)-m-toluic acid and 200 ml of ethanol, there is added 1 gram of 5 percent palladium on carbon and the mixture shaken in a Parr hydrogenation apparatus at a hydrogen pressure of 50 psi until the theoretical quantity of hydrogen has been absorbed. The warm mixture is filtered to remove the catalyst and is concentrated under reduced pressure to yield the desired 5-amino-α-(3-methylureido)-m-toluic acid. The product may be crystallized from aqueous alcohol if desired.

c. 5-Amino-α-(3-methylureido)-2,4,6-triiodo-m-toluic acid

To a mixture of 9 grams of 5-amino-α-(3-methylureido)-m-toluic acid and 300 ml of 15 percent hydrochloric acid there is added, with vigorous stirring a solution of 30 grams of iodine chloride in 50 ml of 6N hydrochloric acid. The reaction mixture is allowed to stir for 24 hours and is then diluted with water. The solid is filtered and dissolved in dilute sodium hydroxide solution. Sodium bisulfite is added to remove the excess iodinating agent and the solution made strongly acid with hydrochloric acid to precipitate the desired 5-amino-α-(3—METHYLUREIDO)-2,4,6-triiodo-m-toluic acid.

d. 5-Acetamido-α-(3-methylureido)-2,4,6-triiodo-m-toluic acid

A mixture of 15 grams of 5-amino-α-(3-methylureido)-2,4,6-triiodo-m-toluic acid, 100 ml of acetic acid and 50 ml of acetic anhydride, to which has been added several drops of concentrated sulfuric acid, is warmed on a steam bath for four hours and then poured, with stirring, into 500 grams of crushed ice. The mixture is allowed to remain overnight to hydrolyze the unreacted acetic anhydride and is then diluted with water and filtered. The solid is washed with water, dissolved in dilute aqueous sodium hydroxide, treated with decolorizing carbon and is then filtered and the filtrate is made strongly acid with 20 percent hydrochloric acid. The precipitate is filtered, washed with water, and dried at 50° under reduced pressure to give the desired 5-acetamido-α-(3-methylureido)-2,4,6-triiodo-m-toluic acid.

EXAMPLE 2

5-Acetamido-α-(3-ethylureido)-2,4,6-triiodo-m-toluic acid

Following the procedure of Example 1, but substituting an equivalent amount of ethyl isocyanate for the methyl isocyanate in part a, there is obtained the desired 5-acetamido-α-(3-ethylureido)-2,4,6-triiodo-m-toluic acid.

EXAMPLE 3

5-Acetamido-α-(3-n-butylureido)-2,4,6-triiodo-m-toluic acid

Following the procedure of Example 1, but substituting an equivalent amount of n-butyl isocyanate for the methyl isocyanate in part a, there is obtained the desired 5-acetamido-α-(3-n-butylureido)-2,4,6-triiodo-m-toluic acid.

EXAMPLE 4

5-Propionylamino-α-(3-methylureido)-2,4,6-triiodo-m-toluic acid

Following the procedure of Example 1 but substituting an equivalent amount of propionic anhydride for the acetic anhydride and an equivalent amount of propionic acid for the acetic acid, there is obtained the desired 5-propionylamino-α-(3-methylureido)-2,4,6-triiodo-m-toluic acid.

EXAMPLE 5

5-Acetamido-α-(3,3-dimethylureido)-2,4,6-triiodo-m-toluic acid a. 5-Nitro-α-(3,3-dimethylureido)-m-toluic acid To a stirred mixture of 2 grams of 5-nitro-α-amino-m-toluic acid in 20 ml of anhydrous pyridine, there is added dropwise, with cooling, a solution of 1 gram of dimethylcarbamoyl chloride in 10 ml of benzene. The reaction mixture is stirred for 2 hours and is then concentrated under reduced pressure to remove the benzene. The residue is poured onto ice and dilute hydrochloric acid. The precipitated solid is filtered, dissolved in dilute aqueous sodium hydroxide and treated with decolorizing carbon. The mixture is filtered and the filtrate made strongly acid with 20 percent hydrochloric acid. The solid is filtered, washed with water and dried to yield the desired 5-nitro-α-(3,3-dimethylureido)-m-toluic acid.

b. 5-Amino-α-(3,3-dimethylureido)-m-toluic acid

Following the procedure of Example 1b, but substituting an equivalent amount of 5-nitro-α-(3,3-dimethylureido)-m-toluic acid for the 5-nitro-α-(3-methylureido)-m-toluic acid, there is obtained the desired 5-amino-α-(3,3-dimethylureido)-m-toluic acid.

c. 5-Amino-α-(3,3-dimethylureido)-2,4,6-triiodo-m-toluic acid

Following the procedure of Example 1c, but substituting an equivalent amount of 5-amino-α-(3,3-dimethylureido)-m-toluic acid for the 5-amino-α-(3-methylureido)-m-toluic acid, there is obtained the desired 5-amino-α-(3,3-dimethylureido)-2,4,6-triiodo-m-toluic acid.

d. 5-Acetamido-α-(3,3-dimethylureido)-2,4,6-triiodo-m-toluic acid

Following the procedure of Example 1d, but substituting an equivalent amount of 5-amino-α-(3,3-dimethylureido)-2,4,6-triiodo-m-toluic acid for the 5-amino-α-(3-methyl-ureido)-2,4,6-triiodo-m-toluic acid, there is obtained the desired 5-acetamido-α-(3,3-dimethylureido)-2,4,6-triiodo-m-toluic acid.

EXAMPLE 6

5-Acetamido-α-(1-ethyl-3-methylureido)-2,4,6-triiodo-m-toluic acid a. 5-Nitro-α-(ethylamino)-m-toluic acid To 5 grams of 5-nitro-α-amino-m-toluic acid in 200 ml of ethanol, there is added 4 ml of acetaldehyde and the reaction mixture stirred for 12 hours. The reaction mixture is warmed gently under reduced pressure to remove unreacted acetaldehyde and to this solution is then added a solution of 1 gram of sodium borohydride in 30 ml of ethanol. The reaction mixture is allowed to stand at room temperature for 1 hour and is then concentrated under reduced pressure at room temperature to about 50 ml. The residue is poured into water and the precipitated solid is filtered. It is dissolved in dilute aqueous sodium hydroxide, filtered and neutralized with acetic acid to yield the desired 5-nitro-α-ethylamino-m-toluic acid, which is recovered by filtration.

b. 5-Nitro-α-(1-ethyl-3-methylureido)-m-toluic acid

Following the procedure of Example 1a, but substituting an equivalent amount of 5-nitro-α-ethylamino-m-toluic acid for the 5-nitro-α-amino-m-toluic acid, there is obtained the desired 5-nitro-α-(1-ethyl-3-methylureido)-m-toluic acid.

c. 5-Amino-α-(1-ethyl-3-methylureido)-m-toluic acid

Following the procedure of Example 1b, but substituting an equivalent amount of 5-nitro-α-(1-ethyl-3-methylureido)-m-toluic acid for the 5-nitro-α-(3-methylureido)-m-toluic acid, there is obtained the desired 5-amino-α-(1-ethyl-3-methylureido)-m-toluic acid.

d. 5-Amino-α-(1-ethyl-3-methylureido)-2,4,6-triiodo-m-toluic acid

Following the procedure of Example 1c, but substituting an equivalent amount of 5-amino-α-(1-ethyl-3-methyl-ureido)-m-toluic acid for the 5-amino-α-(3-methylureido)-m-toluic acid, there is obtained the desired 5-amino-α-(1-ethyl-3-methylureido)-2,4,6-triiodo-m-toluic acid.

e. 5-Acetamido-α-(1-ethyl-3-methylureido)-2,4,6-triiodo-m-toluic acid

Following the procedure of Example 1d, but substituting an equivalent amount of 5-amino-α-(1-ethyl-3-methylureido)-2,4,6-triiodo-m-toluic acid for an equivalent amount of 5-amino-α-(3-methylureido)-2,4,6-triiodo-m-toluic acid, there is obtained the desired 5-acetamido-α-(1-ethyl-3-methylureido)-2,4,6-triiodo-m-toluic acid.

EXAMPLE 7

5-Acetamido-α-(1-ethyl-3,3-dimethylureido)-2,4,6-triiodo-m-toluic acid a. 5-Nitro-α-(1-ethyl-3,3-dimethylureido)-m-toluic acid Following the procedure of Example 5a, but substituting an equivalent amount of 5-nitro-α-ethylamino-m-toluic acid for the 5-nitro-α-amino-m-toluic acid, there is obtained the desired 5-nitro-α-(1-ethyl-3,3-dimethylureido)-m-toluic acid.

b. 5-Amino-α-(1-ethyl-3,3-dimethylureido)-m-toluic acid

Following the procedure of Example 1b, but substituting an equivalent amount of 5-nitro-α-(1-ethyl-3,3-dimethylureido)-m-toluic acid for the 5-nitro-α-(3-methylureido)-m-toluic acid, there is obtained the desired 5-amino-α-(1-ethyl-3,3-dimethylureido)-m-toluic acid.

c. 5-Amino-α-(1-ethyl-3,3-dimethylureido)-2,4,6-triiodo-m-toluic acid

Following the procedure of Example 1c, but substituting an equivalent amount of 5-amino-α-(1-ethyl-3,3-dimethylureido)-m-toluic acid for the 5-amino-α-(3-methylureido)-m-toluic acid, there is obtained the desired 5-amino-α-(1-ethyl-3,3-dimethylureido)-2,4,6-triiodo-m-toluic acid.

d. 5-Acetamido-α-(1-ethyl-3,3-dimethylureido)-2,4,6-triiodo-m-toluic acid

Following the procedure of Example 1d, but substituting an equivalent amount of 5-amino-α-(1-ethyl-3,3-dimethylureido)-2,4,6-triiodo-m-toluic acid for the 5-amino-α-(3-methylureido)-2,4,6-triiodo-m-toluic acid, there is obtained the desired 5-acetamido-α-(1-ethyl-3,3-dimethylureido)-2,4,6-triiodo-m-toluic acid.

EXAMPLE 8

5-(Acetyl-N-ethylamino)-α-(3-methylureido)-2,4,6-triiodo-m-toluic acid a. 5-Ethylamino-α-(3-methylureido)-m-toluic acid A mixture of 10 grams of 5-amino-α-(3-methylureido)-m-toluic acid and 4 ml of acetaldehyde in 200 ml of absolute ethanol is allowed to stand for 12 hours and is then hydrogenated at room temperature and pressure using 5 grams of Raney nickel as catalyst. The catalyst is filtered and the solvent removed by distillation under reduced pressure to yield the desired 5-ethylamino-α-(3-methylureido)-m-toluic acid.

b. 5-Ethylamino-α-(3-methylureido)-2,4,6-triiodo-m-toluic acid

A suspension of 10 grams of 5-ethylamino-α-(3-methylureido)-m-toluic acid in 500 ml of water is stirred vigorously and 5.5 ml of concentrated hydrochloric acid is added slowly. To this mixture there is added, over the course of 1 hour, 67 ml of a 2.5 M sodium iododichloride solution. The reaction mixture is stirred for 72 hours at room temperature and is then treated with sodium bisulfite solution to remove the excess iodinating agent. The precipitated solid is filtered, washed with water and then redissolved in dilute aqueous sodium hydroxide. The solution is treated with decolorizing carbon, filtered, and acidified with 20 percent hydrochloric acid. The solid is filtered, washed with water and dried at 60° under reduced pressure to yield the desired 5-ethylamino-α-(3-methylureido)-2,4,6-triiodo-m-toluic acid.

c. 5-(Acetyl-N-ethylamino)-α-(3-methylureido)-2,4,6-triiodo-m-toluic acid

Following the procedure of Example 1d, but substituting an equivalent amount of 5-ethylamino-α-(3-methylureido)-2,4,6-triiodo-m-toluic acid for the 5-amino-α-(3-methylureido)-2,4,6-triiodo-m-toluic acid, there is obtained the desired 5-(acetyl-N-ethylamine)-α-(3-methylureido)-2,4,6-triiodo-m-toluic acid.

EXAMPLE 9

5-(Acetyl-N-ethylamino)-α-(3,3-dimethylureido)-2,4,6-triiodo-m-toluic acid a. 5-Ethylamino-α-(3,3-dimethylureido)-m-toluic acid Following the procedure of Example 8a, but substituting an equivalent amount of 5-amino-α-(3,3-dimethylureido)-m-toluic acid for the 5-amino-α-(3-methylureido)-m-toluic acid there is obtained the desired 5-ethylamino-α-(3,3-dimethylureido)-m-toluic acid.

b. 5-Ethylamino-α-(3,3-dimethylureido)-2,4,6-triiodo-m-toluic acid

Following the procedure of Example 8b but substituting an equivalent amount of 5-ethylamino-α-(3,3-dimethylureido)-m-toluic acid for the 5-ethylamino-α-(3-methylureido)-m-toluic acid, there is obtained the desired 5-ethylamino-α-(3,3-dimethylureido)-2,4,6-triiodo-m-toluic acid.

c. 5-(Acetyl-N-ethylamino)-α-(3,3-dimethylureido)-2,4,6-triiodo-m-toluic acid

Following the procedure of Example 1d, but substituting an equivalent amount of 5-ethylamino-α-(3,3-dimethylureido)-2,4,6-triiodo-m-toluic acid for the 5-amino-α-(3-methylureido)-2,4,6-triiodo-m-toluic acid, there is obtained the desired 5-(acetyl-N-ethylamino)-α-(3,3-dimethylureido)-2,4,6-triiodo-m-toluic acid.

EXAMPLE 10

5-(Acetyl-N-ethylamino)-α-(1-ethyl-3-methylureido)-2,4,6- triiodo-m-toluic acid a. 5-Ethylamino-α-(1-ethyl-3-methylureido)-m-toluic acid

Following the procedure of Example 8a, but substituting an equivalent amount of 5-amino-α-(1-ethyl-3-methylureido)-m-toluic acid for the 5-amino-α-(3-methylureido-m-toluic acid, there is obtained the desired 5-ethylamino-α-(1-ethyl-3-methyl)-mitoluic acid.

b) 5-Ethylamino-α-(1-ethyl-3-methylureido)-2,4,6-triiodo-m-toluic acid

Following the procedure of Example 8b, but substituting an equivalent amount of 5-ethylamino-α-(1-ethyl-3-methylureido)-m-toluic acid for the 5-ethylamino-α-(3-methylureido)-m-toluic acid, there is obtained the desired 5-ethylamino-α-(1-ethyl-3-methylureido)-2,4,6-triiodo-m-toluic acid.

c. 5-(Acetyl-N-ethylamino)-α-(1-ethyl-3-methylureido)-2,4,6-triiodo-m-toluic acid Following the procedure of Example 1d, but substituting an equivalent amount of 5-ethylamino-α-(1-ethyl-3-methylureido)-2,4,6-triiodo-m-toluic acid for the 5-ethylamino-α-(3-methylureido)-2,4,6-triiodo-m-toluic acid, there is obtained the desired 5-(acetyl-N-ethylamino)-α-(1-ethyl-3-methylureido)-2,4,6-triiodo-m-toluic acid.

EXAMPLE 11

5-(Acetyl-N-ethylamino)-α-(1-ethyl-3,3-dimethylureido)-2,4,6-triiodo-m-toluic acid a. 5-Ethylamino-α-(1-ethyl-3,3-dimethylureido)-m-toluic acid Following the procedure of Example 8a, but substituting an equivalent amount of 5-amino-α-(1-ethyl-3,3-dimethylureido)-m-toluic acid for the 5-amino-α-(3-methylureido)-m-toluic acid, there is obtained the desired 5-ethylamino-α-(1-ethyl-3,3-dimethylureido)-m-toluic acid.

b. 5-Ethylamino-α-(1-ethyl-3,3-dimethylureido)-2,4,6-triiodo-m-toluic acid

Following the procedure of Example 8b, but substituting an equivalent amount of 5-ethylamino-α-(1-ethyl-3,3-dimethylureido)-m-toluic acid for the 5-ethylamino-α-(3-methylureido)-m-toluic acid, there is obtained the desired 5-ethylamino-α-(1-ethyl-3,3-dimethylureido)-2,4,6-triiodo-m-toluic acid.

c. 5-(Acetyl-N-ethylamino)-α-(1-ethyl-3,3-dimethylureido)-2,4,6-triiodo-m-toluic acid Following the procedure of Example 1d, but substituting an equivalent amount of 5-ethylamino-α-(1-ethyl-3,3-dimethylureido)-2,4,6-triiodo-m-toluic acid for the 5-amino-α-(3-methylureido)-2,4,6-triiodo-m-toluic acid, there is obtained the desired 5-(acetyl-N-ethylamino)-α-(1-ethyl-3,3-dimethylureido)-2,4,6-triiodo-m-toluic acid.

EXAMPLE 12

5,α-Bis-(3-methylureido)-2,4,6-triiodo-m-toluic acid

Following the procedure of Example 1a, but substituting an equivalent amount of 5-amino-α-(3-methylureido)-2,4,6-triiodo-m-toluic acid for the 5-nitro-α-amino-m-toluic acid, there is obtained the desired 5,α-bis-(3-methylureido)-2,4,6-triiodo-m-toluic acid.

EXAMPLE 13

5-(3-Methylureido)-α-(3,3-dimethylureido)-2,4,6-triiodo-m-toluic acid

Following the procedure of Example 1a, but substituting an equivalent amount of 5-amino-α-(3,3-dimethylureido)-2,4,6-triiodo-m-toluic acid for the 5-nitro-α-amino-m-toluic acid, there is obtained the desired 5-(3-methylureido)-α-(3,3-dimethylureido)-2,4,6-triiodo-m-toluic acid.

EXAMPLE 14

5-(3-Methylureido)-α-(1-ethyl-3-methylureido)-2,4,6-triiodo-m-toluic acid

Following the procedure of Example 1a, but substituting an equivalent amount of 5-amino-α-(1-ethyl-3-methylureido)-2,4,6-triiodo-m-toluic acid for the 5-nitro-α-amino-m-toluic acid, there is obtained the desired 5-(3-methylureido)-α-(3-methylureido)-2,4,6-triiodo-m-toluic acid.

EXAMPLE 15

5-(3-Methylureido)-α-(1-ethyl-3,3-dimethylureido)-2,4,6-triiodo-m-toluic acid

Following the procedure of Example 1a, but substituting an equivalent amount of 5-amino-α-(1-ethyl-3,3-dimethylureido)-2,4,6-triiodo-m-toluic acid for the 5-nitro-α-amino-m-toluic acid, there is obtained the desired 5-(3-methylureido)-α-(1-ethyl-3,3-dimethylureido)-2,4,6-triiodo-m-toluic acid.

EXAMPLE 16

5-(1-Ethyl-3-methylureido)-α-(3-methylureido)-2,4,6-triiodo-m-toluic acid

Following the procedure of Example 1a, but substituting an equivalent amount of 5-ethylamino-α-(3-methylureido)-2,4,6-triiodo-m-toluic acid for the 5-nitro-α-amino-m-toluic acid, there is obtained the desired 5-(1-ethyl-3-methylureido)-α-(3-methylureido)-2,4,6-triiodo-m-toluic acid.

EXAMPLE 17

5-(1-Ethyl-3-methylureido)-α-(3,3-dimethylureido)-2,4,6-triiodo-m-toluic acid

Following the procedure of Example 1a, but substituting an equivalent amount of 5-ethylamino-α-(3,3-dimethylureido)-2,4,6-triiodo-m-toluic acid for the 5-nitro-α-amino-m-toluic acid, there is obtained the desired 5-(1-ethyl-3-methylureido)-α-(3,3-dimethylureido)-2,4,6-triiodo-m-toluic acid.

Example 18

5,α-Bis-(1-ethyl-3-methylureido)-2,4,6-triiodo-m-toluic acid

Following the procedure of Example 1a, but substituting an equivalent amount of 5-ethylamino-α-(1-ethyl-3-methylureido)-2,4,6-triiodo-m-toluic acid for the 5-nitro-α-amino-m-toluic acid, there is obtained the desired 5,α-bis-(1-ethyl-3-methylureido)-2,4,6-triiodo-m-toluic acid.

EXAMPLE 19

5-(1-Ethyl-3-methylureido)-α-(1-ethyl-3,3-dimethylureido)-2,4,6-triiodo-m-toluic acid Following the procedure of Example 1a, but substituting an equivalent amount of 5-amino-α-(1-ethyl-3,3-dimethylureido)-2,4,6-triiodo-m-toluic acid for the 5-nitro-α-amino-m-toluic acid, there is obtained the desired 5-(1-ethyl-3-methylureido)-α-(1-ethyl-3,3-dimethylureido)-2,4,6-triiodo-m-toluic acid.

EXAMPLE 20

5-(3,3-Dimethylureido)-α-(3-methylureido)-2,4,6-triiodo-m-toluic acid

Following the procedure of Example 5a, but substituting an equivalent amount of 5-amino-α-(3-methylureido)-2,4,6-triiodo-m-toluic acid for the 5-nitro-α-amino-m-toluic acid, there is obtained the desired 5-(3,3-dimethylureido)-α-(3-methylureido)-2,4,6-triiodo-m-toluic acid.

EXAMPLE 21

5,α-Bis-(3,3-dimethylureido)-2,4,6-triiodo-m-toluic acid

Following the procedure of Example 5a, but substituting an equivalent amount of 5-amino-α-(3,3-dimethylureido)-2,4,6-triido-m-toluic acid for the 5-nitro-α-amino-m-toluic acid, there is obtained the desired 5,α-bis-(3,3-dimethylureido)-2,4,6-triiodo-m-toluic acid.

EXAMPLE 22

5-(3,3-Dimethylureido)-α-(1-ethyl-3-methylureido)-2,4,6-triiodo-m-toluic acid

Following the procedure of Example 5a, but substituting an equivalent amount of 5-amino-α-(1-ethyl-3-methylureido)-2,4,6-triiodo-m-toluic acid for the 5-nitro-α-amino-m-toluic acid, there is obtained the desired 5-(3,3-dimethylureido)-α-(1-ethyl-3-methylureido)-2,4,6-triiodo-m-toluic acid.

EXAMPLE 23

5-(3,3-Dimethylureido)-α-(1-ethyl-3,3-dimethylureido)-2,4,6-triiodo-m-toluic acid Following the procedure of Example 5a, but substituting an equivalent amount of 5-amino-α-(1-ethyl-3,3-dimethylureido)-2,4,6-triiodo-m-toluic acid for the 5-nitro-α-amino-m-toluic acid, there is obtained the desired 5-(3,3-dimethylureido)-α-(1-ethyl-3,3-dimethylureido)-2,4,6-triiodo-m-toluic acid.

EXAMPLE 24

5-(1-Ethyl-3,3-dimethylureido)-α-(3-methylureido)-2,4,6-triiodo-m-toluic acid

Following the procedure of Example 5a, but substituting an equivalent amount of 5-ethylamino-α-(3-methylureido)-2,4,6-triiodo-m-toluic acid for the 5-nitro-α-amino-m-toluic acid, there is obtained the desired 5-(1-ethyl-3,3-dimethylureido)-α-(3-methylureido)-2,4,6-triiodo-m-toluic acid.

EXAMPLE 25

5-(1-Ethyl-3,3-dimethylureido)-α-(3,3-dimethylureido)-2,4,6-triiodo-m-toluic acid Following the procedure of Example 5a, but substituting an equivalent amount of 5-ethylamino-α-(3,3-dimethylureido)-2,4,6-triiodo-m-toluic acid for the 5-nitro-α-amino-m-toluic acid, there is obtained the desired 5-(1-ethyl-3,3-dimethylureido)-α-(3,3-dimethylureido)-2,4,6-triiodo-m-toluic acid.

EXAMPLE 26

5-(1-Ethyl-3,3-dimethylureido)-α-(1-ethyl-3-methylureido)-2,4,6-triiodo-m-toluic acid Following the procedure of Example 5a, but substituting an equivalent amount of 5-ethylamino-α-(1-ethyl-3-methylureido)-2,4,6-triiodo-m-toluic acid for the 5-nitro-α-amino-m-toluic acid, there is obtained the desired 5-(1-ethyl-3,3-dimethylureido)-α-(1-ethyl-3-methylureido)-2,4,6-triiodo-m-toluic acid.

EXAMPLE 27

5,α-Bis-(1-ethyl-3,3-dimethylureido)-2,4,6-triiodo-m-toluic acid

Following the procedure of Example 5a, but substituting an equivalent amount of 5-ethylamino-α-(1-ethyl-3,3-dimethylureido)-2,4,6-triiodo-m-toluic acid for the 5-nitro-α-amino-m-toluic acid, there is obtained the desired 5,α-bis-(1-ethyl-3,3-dimethylureido)-2,4,6-triiodo-m-toluic acid.

EXAMPLE 28

5-(3-Methylureido)-α-acetamido-2,4,6-triiodo-m-toluic acid

Following the procedure of Example 1a, but substituting an equivalent amount of 5-amino-α-acetamido-2,4,6-triiodo-m-toluic acid for the 5-nitro-α-amino-m-toluic acid, there is obtained the desired 5-(3-methylureido)-α-acetamido-2,4,6-triiodo-m-toluic acid.

EXAMPLE 29

5-(3,3-Dimethylureido)-α-acetamido-2,4,6-triiodo-m-toluic acid

Following the procedure of Example 5a, but substituting an equivalent amount of 5-amino-α-acetamido-2,4,6-triiodo-m-toluic acid for the 5-nitro-α-amino-m-toluic acid, there is obtained the desired 5-(3,3-dimethylureido)-α-acetamido-2,4,6-triiodo-m-toluic acid.

EXAMPLE 30

5-(1-Ethyl-3-methylureido)-α-acetamido-2,4,6-triiodo-m-toluic acid a. 5-Ethylamino-α-acetamido-m-toluic acid Following the procedure of Example 8a, but substituting an equivalent amount of 5-amino-α-acetamido-m-toluic acid for the 5-amino-α-(3-methylureido)-m-toluic acid, there is obtained the desired 5-ethylamino-α-acetamido-m-toluic acid.

b. 5-Ethylamino-α-acetamido-2,4,6-triiodo-m-toluic acid

Following the procedure of Example 1c, but substituting an equivalent amount of 5-ethylamino-α-acetamido-m-toluic acid for the 5-amino-α-(3methylureido)-m-toluic acid, there is obtained the desired 5-ethylamino-α-acetamido-2,4,6-triiodo-m-toluic acid.

c) 5-(1-Ethyl-3-methylureido)-α-acetamido-2,4,6-triiodo-m-toluic acid

Following the procedure of Example 1a, but substituting an equivalent amount of 5-ethylamino-α-acetamido-2,4,6-triiodo-m-toluic acid for the 5-nitro-α-amino-m-toluic acid, there is obtained the desired 5-(1-ethyl-3-methylureido)-α-acetamido-2,4,6-triiodo-m-toluic acid.

EXAMPLE 31

5-(1-Ethyl-3,3-dimethylureido)-α-acetamido-2,4,6-triiodo-m-toluic acid

Following the procedure of Example 5a, but substituting an equivalent amount of 5-ethylamino-α-acetamido-2,4,6-triiodo-m-toluic acid for the 5-nitro-α-amino-m-toluic acid, there is obtained the desired 5-(1-ethyl-3,3-dimethylureido)-α-acetamido-2,4,6-triiodo-m-toluic acid.

EXAMPLE 32

5-(3-Methylureido)-α-(acetyl-N-ethylamino)-2,4,6-triiodo-m-toluic acid a. 5-Nitro-α-(acetyl-N-ethylamino)-m-toluic acid Ten grams of 5-nitro-α-ethylamino-m-toluic acid is dissolved in an equivalent amount of 1 N sodium hydroxide solution and 5 ml of acetic anhydride added dropwise with vigorous stirring at 50°. The reaction mixture is stirred for an additional two hours and is then filtered. The solid is washed with water and dried to give the desired 5-nitro-α-(acetyl-N-ethylamino)-m-toluic acid.

b. 5-Amino-α-(acetyl-N-ethylamino)-m-toluic acid

Following the procedure of Example 1b, but substituting an equivalent amount of 5-nitro-α-(acetyl-N-ethylamino)-m-toluic acid for the 5-nitro-α-(3-methylureido)-m-toluic acid, there is obtained the desired 5-amino-α-(acetyl-N-ethylamino)-m-toluic acid.

c. 5-Amino-α-(acetyl-N-ethylamino)-2,4,6-triiodo-m-toluic acid

Following the procedure of 1c, but substituting an equivalent amount of 5-amino-α-(acetyl-N-ethylamino)-m-toluic acid for the 5-amino-α-(3-methylureido)-m-toluic acid, there is obtained the desired 5-amino-α-(acetyl-N-ethylamino)-2,4,6-triiodo-m-toluic acid.

d. 5-(3-Methylureido)-α-(acetyl-N-ethylamino)-2,4,6-triiodo-m-toluic acid

Following the procedure of Example 1a, but substituting an equivalent amount of 5-amino-α-(acetyl-N-ethylamino)-2,4,6-triiodo-m-toluic acid for the 5-nitro-α-amino-m-toluic acid, there is obtained the desired 5-(3-methylureido)-α-(acetyl-N-ethylamino)-2,4,6-triiodo-m-toluic acid.

EXAMPLE 33

5-(3,3-Dimethylureido)-α-(acetyl-N-ethylamino)-2,4,6-triiodo-m-toluic acid

Following the procedure of Example 5a, but substituting an equivalent amount of 5-amino-α-(acetyl-N-ethylamino)-2,4,6-triiodo-m-toluic acid for the 5-nitro-α-amino-m-toluic acid, there is obtained the desired 5-(3,3-dimethylureido)-α-(acetyl-N-ethylamino)-2,4,6-triiodo-m-toluic acid.

EXAMPLE 34

5-(1-Ethyl-3-methylureido)-α-(acetyl-N-ethylamino)-2,4,6-triiodo-m-toluic acid a. 5-Ethylamino-α-(acetyl-N-ethylamino)-m-toluic acid Following the procedure of Example 8a, but substituting an equivalent amount of 5-amino-α-(acetyl-N-ethylamino)-m-toluic acid for the 5-amino-α-(3-methylureido)-m-toluic acid, there is obtained the desired 5-ethylamino-α-(acetyl-N-ethylamino)-m-toluic acid.

b. 5-Ethylamino-α-(acetyl-N-ethylamino)-2,4,6-triiodo-m-toluic acid

Following the procedure of Example 1c, but substituting an equivalent amount of 5-ethylamino-α-(acetyl-N-ethylamino)-m-toluic acid for the 5-amino-α-(3-methylureido)-m-toluic acid, there is obtained the desired 5-ethylamino-α-(acetyl-N-ethylamino)-2,4,6-triiodo-m-toluic acid.

c. 5-(1-Ethyl-3-methylureido)-α-(acetyl-N-ethylamino)-2,4,6-triiodo-m-toluic acid Following the procedure of Example 1a, but substituting an equivalent amount of 5-ethylamino-α-(acetyl-N-ethylamino)-2,4,6-triiodo-m-toluic acid for the 5-nitro-α-amino-m-toluic acid, there is obtained the desired 5-(1-ethyl-3-methylureido)-α-(1-acetyl-N-ethylamino)-2,4,6-triiodo-m-toluic acid.

EXAMPLE 35

5-(1-Ethyl-3,3-dimethylureido)-α-(acetyl-N-ethylamino)-2,4,6-triiodo-m-toluic acid Following the procedure of Example 5a, but substituting an equivalent amount of 5-ethylamino-α-(acetyl-N-ethylamino)-2,4,6-triiodo-m-toluic acid for the 5-nitro-α-amino-m-toluic acid, there is obtained the desired 5-(1-ethyl-3,3-dimethylureido)-α-(acetyl-N-ethylamino)-2,4,6-triiodo-m-toluic acid.

EXAMPLE 36

5-Acetamido-α-(3-methylureido)-2,4,6-triiodo-m-toluic acid, ethyl ester

To a slurry of 20 grams of 5-acetamido-α-(3-methylureido)-2,4,6-triiodo-m-toluic acid in 100 ml of anhydrous ethanol there is added a solution of 2 grams of potassium hydroxide in 50 ml of anhydrous ethanol. To this mixture there is added 4.5 ml of diethyl sulfate and the reaction mixture is stirred for 24 hours. The mixture is diluted with 250 ml of water and the precipitated solid is collected by filtration. The solid is suspended in dilute alkali and filtered. The ethyl 5-acetamido-α-(3-methylureido)-2,4,6-triiodo-m-toluate may be purified by solution in warm dimethyl formamide, treatment with decolorizing carbon, filtering and precipitation with water.

EXAMPLE 27

5,-α-Bis-(3-methylureido)-2,4,6-triiodo-m-toluic acid
[Alternate preparation]

Following the procedure of Example 1a, but substituting an equivalent amount of 5α-diamino-2,4,6-triiodo-m-toluic acid for the 5-nitro-α-amino-m-toluic acid, there is obtained the desired 5,α-bis-(3-methylureido)-2,4,6-triiodo-m-toluic acid.

EXAMPLE 38

5,α-Bis-(3,3-dimethylureido)-2,4,6-triiodo-m-toluic acid
[Alternate preparation]

Following the procedure of Example 5a, but substituting an equivalent amount of 5,α-diamino-2,4,6-triiodo-m-toluic acid for the 5-nitro-α-amino-m-toluic acid and using twice the quantity of dimethylcarbamoyl chloride, there is obtained the desired 5,α-bis-(3,3-dimethylureido)-2,4,6-triiodo-m-toluic acid.

What is claimed is:

1. A compound of the formula

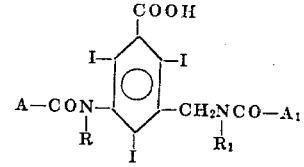

wherein R and R$_1$ are hydrogen or lower alkyl of up to six carbon atoms and A and A$_1$ are lower alkyl of up to six carbon atoms or

wherein R$_2$ is hydrogen or lower alkyl of up to 6 carbon atoms, and R$_3$ is lower alkyl of up to six carbon atoms, provided that A and A$_1$ are not both lower alkyl, and the lower alkyl esters and physiologically acceptable salts thereof, wherein the alkyl ester has up to six carbon atoms.

2. A compound of claim 1 wherein R and R$_1$ are hydrogen.
3. A compound of claim 1 wherein R and R$_1$ are lower alkyl.
4. A compound of claim 1 wherein A and A$_1$ are

5. A compound of claim 1 wherein R is hydrogen.
6. A compound of claim 1 wherein R is lower alkyl.
7. A compound of claim 1 wherein A is lower alkyl.
8. A compound of claim 1 wherein A$_1$ is lower alkyl.

* * * * *